United States Patent
Lee

(10) Patent No.: US 7,151,517 B2
(45) Date of Patent: Dec. 19, 2006

(54) APPARATUS AND METHOD OF DRIVING DISPLAY DEVICE

(75) Inventor: Baek-Woon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 484 days.

(21) Appl. No.: 10/778,714

(22) Filed: Feb. 13, 2004

(65) Prior Publication Data
US 2004/0223005 A1   Nov. 11, 2004

(30) Foreign Application Priority Data
Mar. 25, 2003   (KR) ................. 10-2003-0018427

(51) Int. Cl.
G09G 3/36        (2006.01)
(52) U.S. Cl. .................. 345/88; 345/690
(58) Field of Classification Search ............ 345/204, 345/690, 88, 89
See application file for complete search history.

(56) References Cited

U.S. PATENT DOCUMENTS 6,724,934 B1 *   4/2004   Lee et al. ............. 382/167
6,750,874 B1 *   6/2004   Kim ..................... 345/600
6,897,876 B1 *   5/2005   Murdoch et al. ....... 345/589

* cited by examiner

Primary Examiner—Jimmy H. Nguyen
(74) Attorney, Agent, or Firm—Cantor Colburn LLP

(57) ABSTRACT

Grays of input image signals in a set of input three-color image signals are compared to determine a maximum input gray (Max), a middle input gray (Mid), and a minimum input gray (Min) among the input image signals and to assign an order index to the signal set. The Max, Mid, and Min are gamma-converted into Γ(Max), Γ(Mid), and Γ(Min), respectively, and a maximum output gray (Max'), a middle output gray (Mid'), a minimum output gray (Min'), and an output white signal (W') are determined. The four color image signals are generated from the Max', Mid', Min', and W' based on the order index.

13 Claims, 11 Drawing Sheets

50% RGB Increase

RGBW

APPARATUS AND METHOD OF DRIVING DISPLAY DEVICE

BACKGROUND OF THE INVENTION

1. Field of the Invention

The present invention relates to an apparatus and a method of driving a display device.

2. Description of the Related Art

Display devices include a cathode ray tube (CRT), a plasma display panel (PDP), a liquid crystal display (LCD), an organic electro luminance (EL) display, etc. The display devices are used for various devices such as monitors, television sets, indoor and outdoor signboards, etc., and they are required to have high luminance for the television sets and the signboards. The LCD, which is a non-emissive display, has one of main disadvantages of low luminance.

An LCD includes two panels provided with field-generating electrodes such as pixel electrodes and a common electrode and a liquid crystal (LC) layer with dielectric anisotropy disposed between the panels. The pixel electrodes are arranged in a matrix and connected to switching elements such as thin film transistors (TFTs) such that they are supplied with data voltages row by row in a sequential manner. The common electrode covers an entire surface of one of the panels and it is supplied with a common electrode. A pixel electrode and a common electrode as well as a LC layer interposed therebetween form a LC capacitor, and the LCD capacitor and a switching element connected thereto are basic elements of a pixel.

The LCD applies voltages to the field-generating electrodes to form an electric field in the LC layer and adjusts the field strength to control transmittance of light passing through the LC layer, thereby realizing desired images. The LCD reverses a polarity of data voltages, which are applied to the pixel electrodes, with respect to the common voltage by frame, row or dot in order to prevent the deterioration of the LC layer due to long-time application of a unidirectional electric field.

In the meantime, each pixel represents a color for color display by providing red, green or blue color filter facing the pixel electrode.

The red, greed, and blue color filters are usually arranged in stripes, in mosaics, or in deltas. The striped arrangement arranges the color filters such that the color filters in a column represent the same color, and the mosaic arrangement arranges the color filters such that the red, green, and blue color filters are sequentially arranged in a row direction and in a column direction. In the deltaic arrangement, the color filters form a plurality of rows, each row including red, green, and blue color filters arranged in sequence, and the color filters in adjacent rows are offset. Since a dot in the deltaic arrangement can include red, green, and blue color filters arranged in a triangle, the deltaic arrangement has an advantage in displaying circles or oblique lines.

However, such a three color LCD has relatively low light efficiency since the red, green, and blue color filters transmits incident light by one thirds.

SUMMARY OF THE INVENTION

An apparatus of driving a display device including a plurality of four color pixels, the apparatus is provided, which includes: an input unit receiving three color image signals; an image signal modifier converting the three color image signals into four color image signals; and an output unit outputting the four color image signals.

The image signal modifier according to an embodiment (a) compares grays of the input image signals in a set of three color image signals to determine a maximum input gray (Max), a middle input gray (Mid), and a minimum input gray (Min) among the input image signals and to assign an order index to the signal set; (b) gamma-converts the Max, Mid, and Min into $\Gamma(Max)$, $\Gamma(Mid)$, and $\Gamma(Min)$, respectively, wherein an inverse gamma conversion is indicated by $\Gamma^{-1}$; (c) determines a maximum output gray (Max'), a middle output gray (Mid'), a minimum output gray (Min'), and an output white signal (W') such that if $\Gamma(Max) > 2\Gamma(Min)$, Max'=Max, $Mid' = Max\ \Gamma^{-1}\{[\Gamma(Mid) - \Gamma(Min)]/[\Gamma(Max) - \Gamma(Min)]\}$, Min'=0, and $W' = Max\ Min/\Gamma^{-1}[\Gamma(Max) - \Gamma(Min)]$;

if $\Gamma(Max) \leq 2\Gamma(Min)$ and $2\Gamma(Min) \leq \Gamma(Gmax)$, where $Gmax$ is a highest gray, $Max' = \Gamma^{-1}[2\Gamma(Max) - 2\Gamma(Min)]$, $Mid' = \Gamma^{-1}[2\Gamma(Mid) - 2\Gamma(Min)]$, Min'=0, $W' = \Gamma^{-1}[2\Gamma(Min)]$; and if $\Gamma(Max) > 2\Gamma(Min)$ and $2\Gamma(Min) > \Gamma(Gmax)$, $Max' = \Gamma^{-1}[2\Gamma(Max) - \Gamma(Gmax)]$, $Mid' = \Gamma^{-1}[2\Gamma(Mid) - \Gamma(Gmax)]$, $Min' = \Gamma^{-1}[2\Gamma(Min) - \Gamma(Gmax)]$, and W'=Gmax; and (d) generates the four color image signals from the Max', Mid', Min', and W' based on the order index.

The gamma conversion is preferably performed by using a look-up table.

Preferably, the inverse gamma conversion is performed by using at least a look-up table, the inverse gamma conversion maps a plurality of sections of a first variable into a plurality of sections of a second variable such that the sections of the first variable have different lengths, a longer section of the first variable includes higher values, and the sections of the second variable have substantially the same length.

The apparatus may further include: a gray voltage generator generating a plurality of gray voltages; and a data driver selecting data voltages among the gray voltages corresponding to the four color image signals and applying the data voltages to the pixels.

The four color image signals may have a plurality of grays representing luminance and luminance difference between higher grays is smaller than luminance difference between lower grays.

The order index may apply an order of the grays of the input image signals to grays of the four color image signals.

A method of driving a display device including a plurality of four color pixels is provided, the method includes: (a) comparing grays of input image signals in a set of input three-color image signals to determine a maximum input gray (Max), a middle input gray (Mid), and a minimum input gray (Min) among the input image signals and to assign an order index to the signal set; (b) gamma-converting the Max, Mid, and Min into Γ(Max), Γ(Mid), and Γ(Min), respectively, wherein an inverse gamma conversion is indicated by $\Gamma^{-1}$; (c) determining a maximum output gray (Max'), a middle output gray (Mid'), a minimum output gray (Min'), and an output white signal (W') such that if Γ(Max)>2Γ(Min), Max'=Max, $Mid'$=Max $\Gamma^{-1}\{[\Gamma(Mid)-\Gamma(Min)]/[\Gamma(Max)-\Gamma(Min)]\}$, Min'=0, and $W'$=Max Min/$\Gamma^{-1}[\Gamma(Max)-\Gamma(Min)]$;

if Γ(Max)≦2Γ(Min) and 2Γ(Min)≦Γ(Gmax), where Gmax is a highest gray,

Max'=$\Gamma^{-1}[2\Gamma(Max)-2\Gamma(Min)]$, $Mid'$=$\Gamma^{-1}[2\Gamma(Mid)-2\Gamma(Min)]$, Min'=0, $W'$=$\Gamma^{-1}[2\Gamma(Min)]$; and if Γ(Max)>2Γ(Min) and 2Γ(Min)>Γ(Gmax), Max'=$\Gamma^{-1}[2\Gamma(Max)-\Gamma(Gmax)]$, $Mid'$=$\Gamma^{-1}[2\Gamma(Mid)-\Gamma(Gmax)]$, Min'=$\Gamma^{-1}[2\Gamma(Min)-\Gamma(Gmax)]$, and W'=Gmax; and (d) generating the four color image signals from the Max', Mid', Min', and W' based on the order index.

The inverse gamma conversion may map a plurality of sections of a first variable into a plurality of sections of a second variable such that the sections of the first variable have different lengths, a longer section of the first variable includes higher values, and the sections of the second variable have substantially the same length.

The inverse gamma conversion or the gamma conversion is performed by using at least a look-up table.

The method of driving a display device including a plurality of four color pixels may further include: generating a plurality of gray voltages; selecting data voltages among the gray voltages corresponding to the four color image signals; and applying the data voltages to the pixels.

The four color image signals may have a plurality of grays representing luminance and luminance difference between higher grays is smaller than luminance difference between lower grays.

The order index may apply an order of the grays of the input image signals to grays of the four color image signals.

BRIEF DESCRIPTION OF THE DRAWINGS

The present invention will become more apparent by describing embodiments thereof in detail with reference to the accompanying drawing in which.

DETAILED DESCRITPION OF EMBODIMENTS

Figure 1:
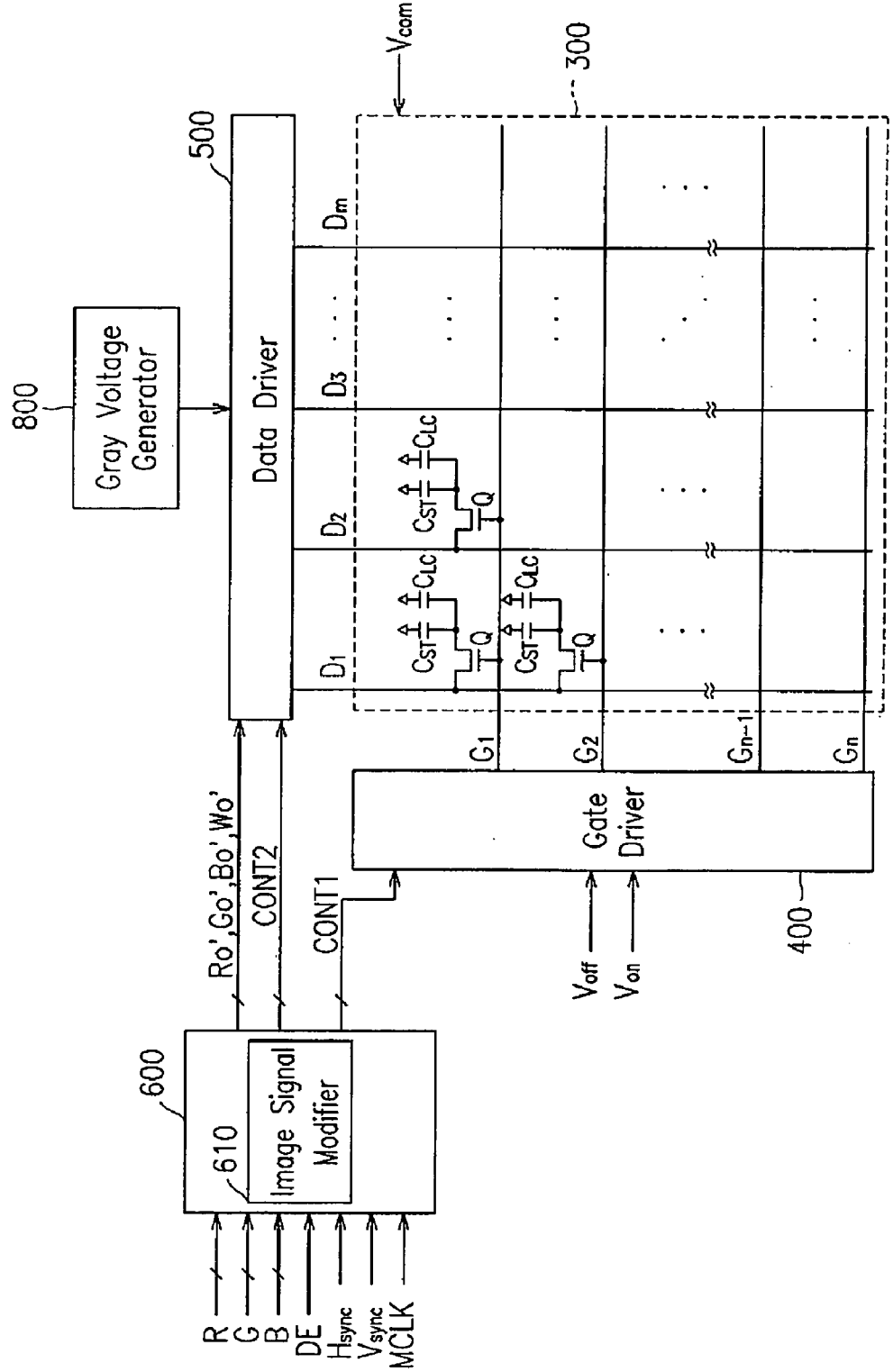
FIG. 1 is a block diagram of an LCD according to an embodiment of the present invention.

The present invention now will be described more fully hereinafter with reference to the accompanying drawings, in which embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, apparatus and methods of driving a display device are described with reference to accompanying drawings.

Figure 2:
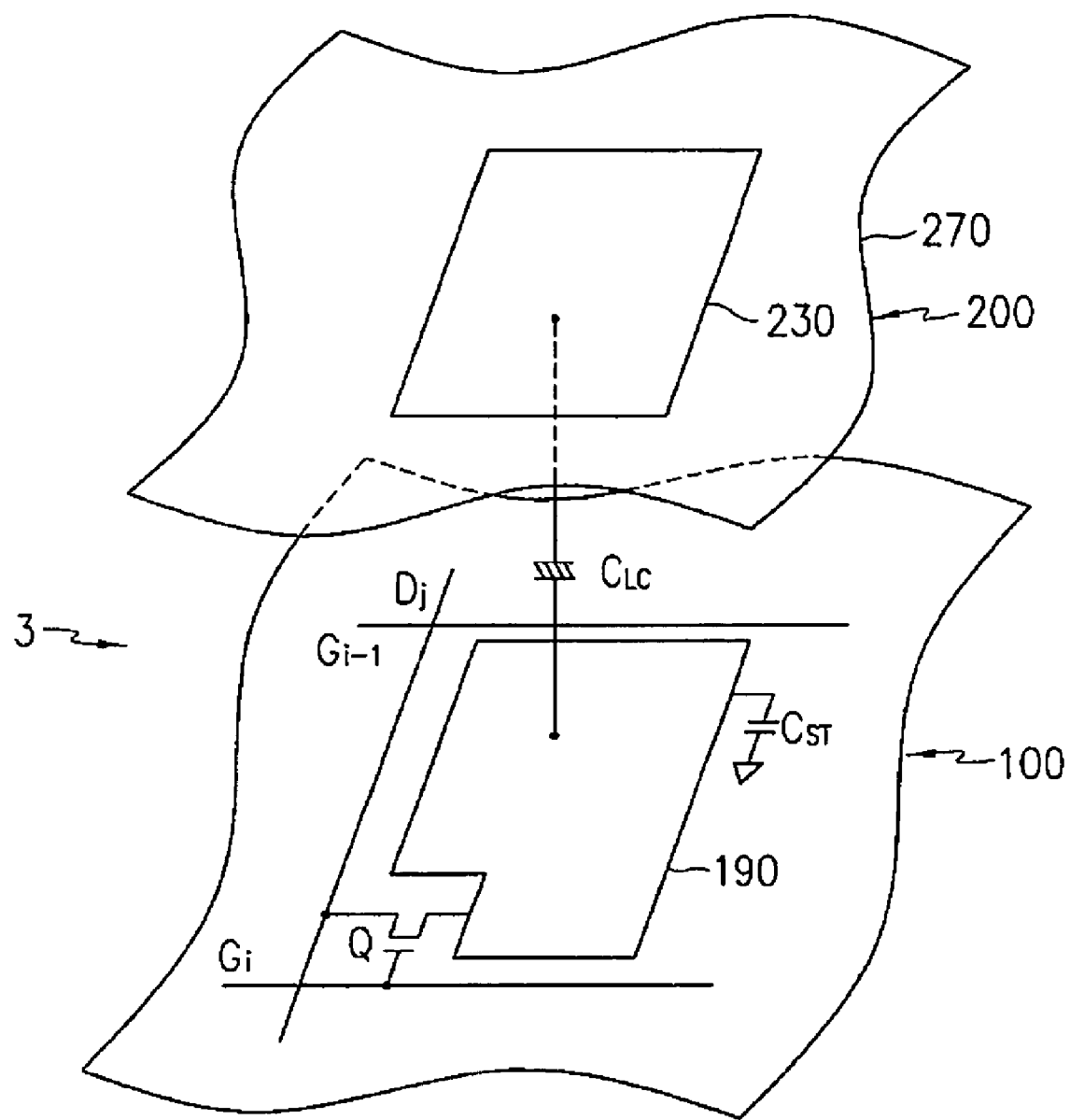
FIG. 2 is an equivalent circuit diagram of a pixel of an LCD according to an embodiment of the present invention.

FIG. 1 is a block diagram of an LCD according to an embodiment of the present invention and FIG. 2 is an equivalent circuit diagram of a pixel of an LCD according to an embodiment of the present invention.

Referring to FIG. 1, an LCD according to an embodiment of the present invention includes a liquid crystal panel assembly 300, a gate driver 400 and the data driver 500 connected to the panel assembly 300, a gray voltage generator 800 connected to the data driver 500, and a signal controller 600 controlling the above-described elements.

The liquid crystal panel assembly 300 includes a lower panel 100, an upper panel 200, and a liquid crystal layer 3 from a structural view as shown in FIG. 2, while it includes a plurality of display signal lines $G_1$–$G_n$ and $D_1$–$D_m$ and a plurality of pixels connected thereto and arranged approximately in a matrix from a circuital view as shown in FIG. 1.

The display signal lines $G_1$–$G_n$ and $D_1$–$D_m$ include a plurality of gate lines $G_1$–$G_n$ transmitting gate signals (also referred to as "scanning signals"), and a plurality of data lines $D_1$–$D_m$ transmitting data signals. The gate lines $G_1$–$G_n$ extend substantially in a row direction and substantially parallel to each other, while the data lines $D_1$–$D_m$ extend substantially in a column direction and substantially parallel to each other.

Each pixel includes a switching element Q connected to the signal lines $G_1$–$G_n$ and $D_1$–$D_m$, and a LC capacitor $C_{LC}$ and a storage capacitor $C_{ST}$ that are connected to the switching element Q. The storage capacitor $C_{ST}$ may be omitted.

The switching element Q is provided on the lower panel 100 and has three terminals: a control terminal connected to one of the gate lines $G_1$–$G_n$; an input terminal connected to one of the data lines $D_1$–$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on the upper panel 200 as two terminals. The LC layer 3 disposed between the two electrodes 190 and 270 functions as dielectric of the LC capacitor $C_{LC}$. The pixel electrode 190 is connected to the switching element Q. The common electrode 270 is connected to the common voltage $V_{com}$ and covers entire surface of the upper panel 200. Unlike FIG. 2, the common electrode 270 may be provided on the lower panel 100, and both electrodes 190 and 270 have shapes of bar or stripes.

The storage capacitor $C_{ST}$ is defined by the overlap of the pixel electrode 190 and a separate wire (not shown) provided on the lower panel 100 and supplied with a predetermined voltage such as the common voltage $V_{com}$. Alternatively, the storage capacitor $C_{ST}$ is defined by the overlap of the pixel electrode 190 and its previous gate line $G_{i-1}$ via an insulator.

Each pixel represents its own color by providing one of a plurality of color filters 230 in an area corresponding to the pixel electrode 190. The color filter 230 shown in FIG. 2 is provided on the upper panel 200. Alternatively, the color filters 230 are provided on or under the pixel electrode 190 on the lower panel 100.

The color of the color filter 230 is one of the primary colors such as red, green, blue, and white. Hereinafter, a pixel is referred to as red, greed, blue or white pixel based on the color represented by the pixel and indicated by reference numeral RP, GP, BP or WP, which is also used to indicate a pixel area occupied by the pixel. The white pixel WP may have no color filter and may represent white color by means of other mechanisms.

A pair of polarizers (not shown) polarizing incident light are attached on the outer surfaces of the panels 100 and 200 of the panel assembly 300.

Spatial arrangements of pixels of LCDs according to embodiments of the present invention are described with reference to FIGS. 3 to 8.

Figure 3:
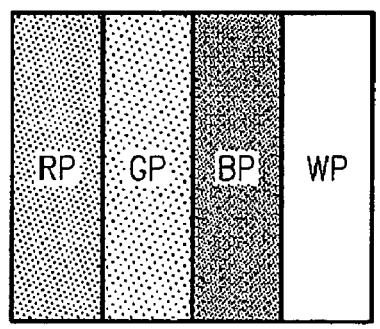
FIGS. 3–5 illustrate striped arrangements of pixels of LCDs according to an embodiment of the present invention.
Figure 4:
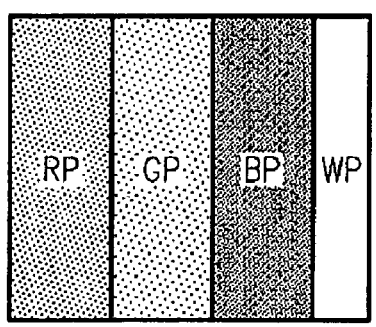
Figure 5:
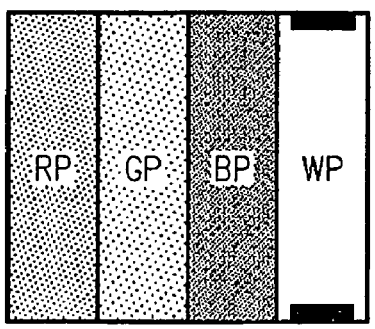

FIGS. 3–5 illustrate striped arrangements of pixels of LCDs according to an embodiment of the present invention.

Referring to FIGS. 3–5, a plurality of pixels are arranged in a matrix including a plurality of pixel row and a plurality of pixel columns.

Each pixel row includes pixels representing four colors, i.e., red pixels RP, green pixels GP, blue pixels BP, and white pixels WP arranged in sequence, while each pixel column includes only one kind of pixels among the four color pixels RP, GP, BP and WP. The sequence of the pixels in a pixel row can be altered.

A group of four pixels shown in FIGS. 3–5 form a dot, which is an elementary unit for an image.

All pixels shown in FIG. 3 have substantially equal size, while the pixels shown in FIGS. 4 and 5 do not have equal size. Referring to FIGS. 4 and 5, the white pixel WP is smaller than the red, green and blue pixels RP, GP and BP to prevent the reduction of the color saturation due to the addition of the white pixel WP. The red, green and blue pixels RP, GP and BP may have equal size.

As shown in FIG. 4, the red, green and blue pixels RP, GP and BP are enlarged and the white pixel WP is reduced, compared with those shown in FIG. 3. The ratio of the size of the white pixel WP and the size of the red, green and blue pixels RP, GP and BP is determined by considering the luminance of a backlight unit (not shown) and a target color temperature. The size of the white pixel WP may be half or quarter of other pixels RP, GP and BP.

As shown in FIG. 5, the white pixel WP is reduced while the size of the red, green and blue pixels RP, GP and BP are not changed, compared with those shown in FIG. 3. The reduction of the white pixel WP is obtained by widening the signal lines such as the gate lines $G_1$–$G_n$ or the data lines $D_1$–$D_m$ (shown in FIGS. 1 and 2) near the white pixel WP or by widening a portion of a black matrix (not shown), which can be provided on the upper panel 200, enclosing the white pixel WP. It is preferable that intersecting area between the gate lines $G_1$–$G_m$ and the data lines $D_1$–$D_m$ is not increased since the intersecting area causes capacitive load to the signal lines.

Figure 6:
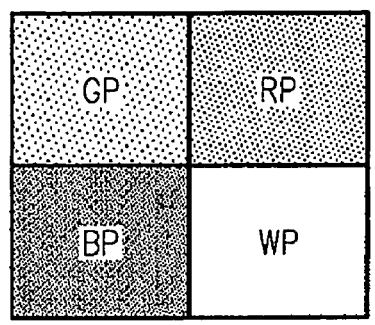
FIGS. 6–8 illustrate mosaic pixel arrangements of LCDs according to an embodiment of the present invention.
Figure 7:
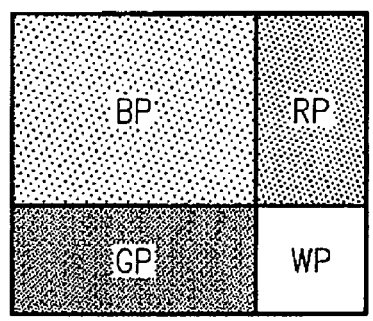
Figure 8:
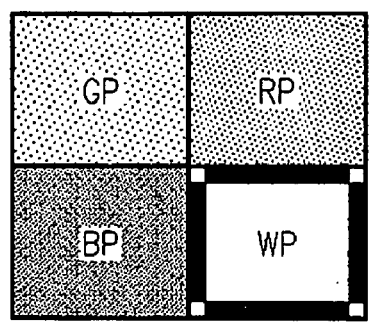

FIGS. 6–8 illustrate mosaic pixel arrangements of LCDs according to an embodiment of the present invention.

Referring to FIGS. 6–8, each pixel row and each pixel column include two kinds of pixels among the four color pixels RP, GP, BP and WP.

Referring to FIGS. 6 and 8, the pixel rows including the green and red pixels GP and RP and the pixel rows including the blue and white pixels BP and WP are alternately arranged. In view of columns, the pixel columns including the green and blue pixels GP and BP and the pixel columns including the red and white pixels RP and WP are alternately arranged.

Referring to FIG. 7, the pixel rows including the blue and red pixels BP and RP and the pixel rows including the green and white pixels GP and WP are alternately arranged. In view of columns, the pixel columns including the blue and green pixels BP and GP and the pixel columns including the red and white pixels RP and WP are alternately arranged.

The sequence of the pixels in a pixel row and a pixel column can be also altered.

FIGS. 6–8 show a dot including a group of four pixels forming a 2×2 matrix.

All pixels shown in FIG. 6 have substantially equal size, while the pixels shown in FIGS. 7 and 8 do not have equal size. Referring to FIGS. 7 and 8, the white pixel WP is smaller than the red, green and blue pixels RP, GP and BP. The red, green and blue pixels RP, GP and BP may have equal or different sizes.

As shown in FIG. 7, the white pixel WP is reduced and the red, green and blue pixels RP, GP and BP are enlarged and, compared with those shown in FIG. 6. The mosaic pixel arrangement prevents the red, green and blue pixels RP, GP and BP from being equally enlarged. As described above, the ratio of the size of the white pixel WP and the size of the red, green and blue pixels RP, GP and BP is determined by considering the luminance of a backlight unit and a target color temperature. Since the variation of the amount of the blue light is relatively insensitive to a person compared with red and green light, and hence, the influence of the areal increase of the blue pixel BP on the image quality is relatively small, it is preferable that the increased area of the blue pixel BP is larger than those of the red pixel RP and the green pixel GP and thus the sequence of the pixels are altered as shown in FIG. 7. The size of the white pixel WP may be quarter of the blue pixel BP and half of the red and green pixels RP and GP.

As shown in FIG. 8, the white pixel WP is reduced by widening both or either of portions of the gate lines G1–Gn and the data lines D1–Dm (shown in FIGS. 1 and 2) near the white pixel WP. It is also preferable that intersecting area between the gate lines G1–Gm and the data lines D1–Dm is not increased.

These configurations of a four color LCD increase the light transmittance.

Since the red, green and blue color filters transmit one thirds of incident light, the light transmittance of a white pixel WP is about three times that of other color pixels RP, GP and BP. Accordingly, the inclusion of the white pixels WP improves the optical efficiency without increasing the total area of the dot.

Assume that the amount of incident light is one.

For a dot including three pixels, i.e., red, green and blue pixels, the area of each pixel is one thirds of the total area of the dot. Since the light transmittance of the color filter in the pixels is one thirds, the total light transmittance of the dot is equal to $\frac{1}{3} \times \frac{1}{3} + \frac{1}{3} \times \frac{1}{3} + \frac{1}{3} \times \frac{1}{3} = \frac{1}{3} \approx 33.3\%$.

For a dot shown in FIGS. 3 and 6, the area of each pixel is a quarter of the total area. Since the light transmittance of the white pixel WP is one, while that of the other pixels RP, GP and BP is one thirds, the total light transmittance of the dot equals to $\frac{1}{4} \times \frac{1}{3} + \frac{1}{4} \times \frac{1}{3} + \frac{1}{4} \times \frac{1}{3} + \frac{1}{4} \times 1 = \frac{6}{12} \approx 50\%$. Accordingly, the brightness is increased to be about 1.5 times compared with a three-color LCD.

In addition, the reduction of the area of the white pixel WP shown in FIGS. 4, 5, 7 and 8 reduces deterioration of color level or color saturation (chromaticity), which may occur due to the increase of the luminance.

An exemplary detailed structure of a TFT array panel for an LCD according to an embodiment of the present invention will be described with reference to FIGS. 9 and 10.

Figure 9:
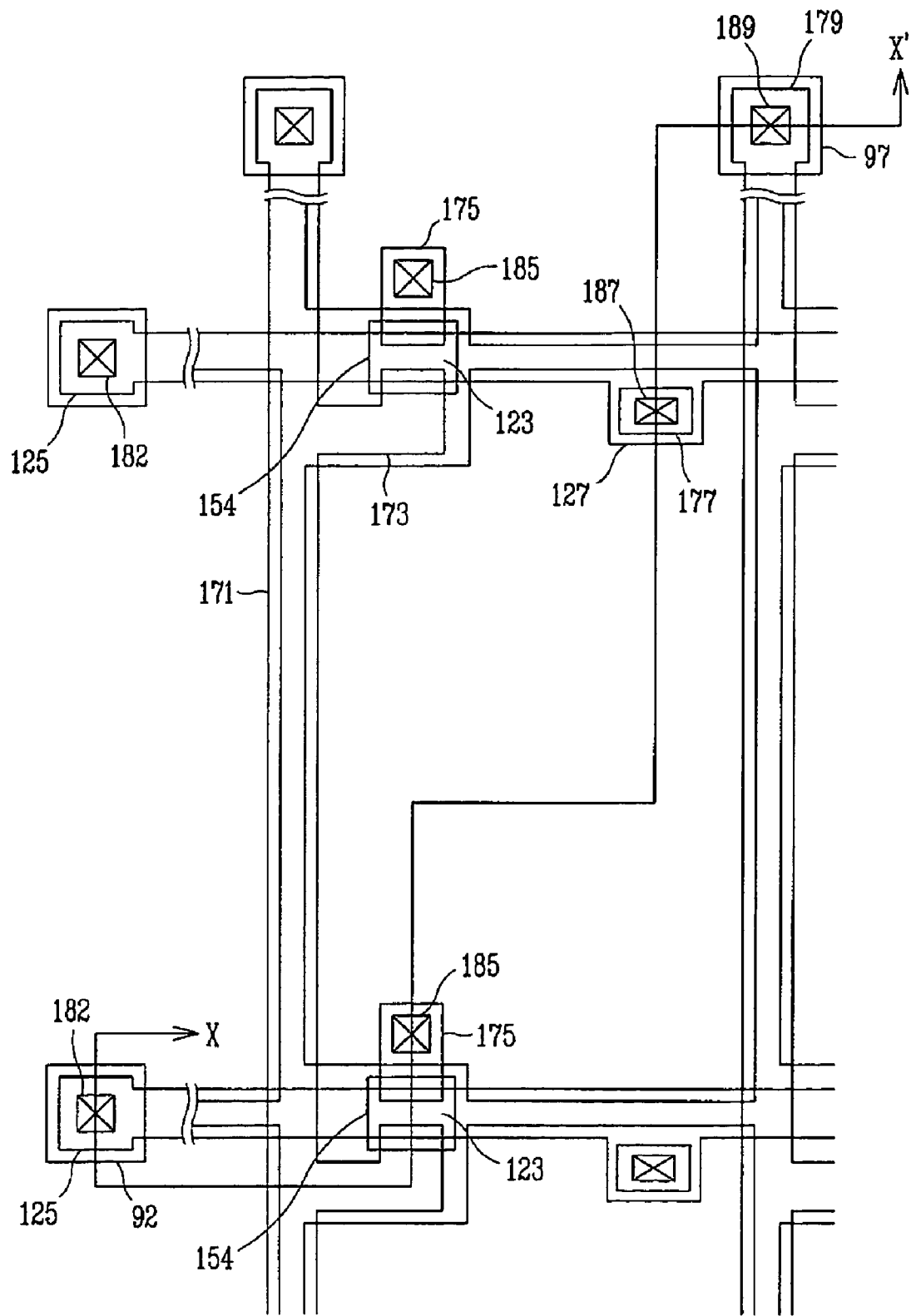
FIG. 9 is a layout view of an exemplary TFT array panel for an LCD according to an embodiment of the present invention.
Figure 10:
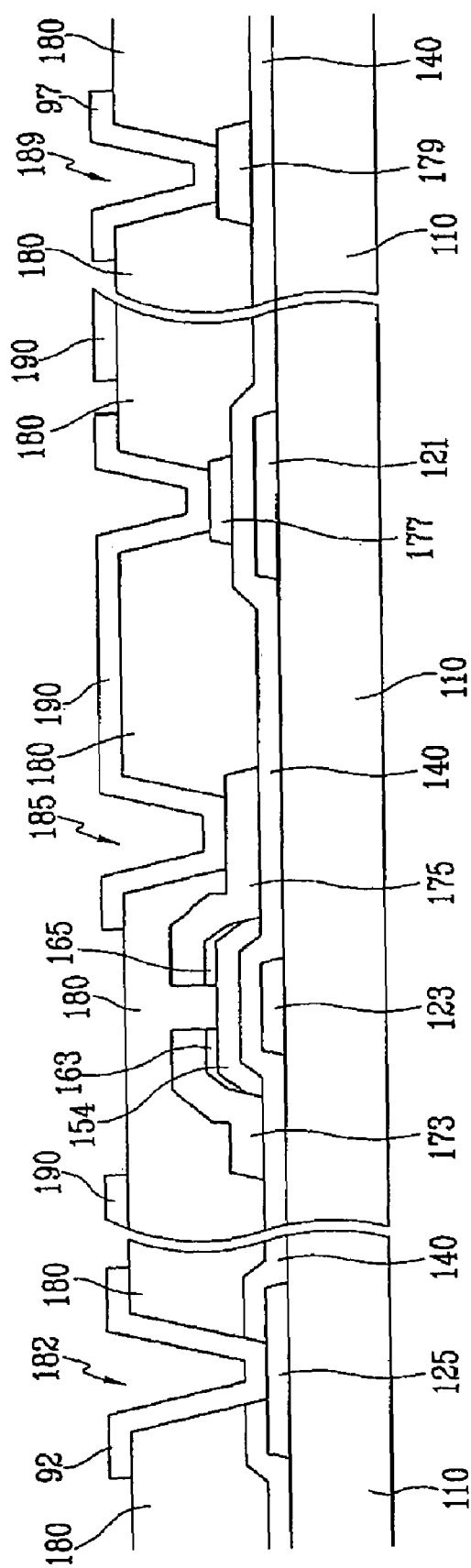
FIG. 10 is a sectional view of the TFT array panel shown in FIG. 9 taken along the line X-X'.

FIG. 9 is a layout view of an exemplary TFT array panel for an LCD according to an embodiment of the present invention, and FIG. 10 is a sectional view of the TFT array panel shown in FIG. 9 taken along the line X-X'.

A plurality of gate lines 121 for transmitting gate signals are formed on an insulating substrate 110. Each gate line 121 extends substantially in a transverse direction and a plurality of portions of each gate line 121 form a plurality of gate electrodes 123. Each gate line 121 includes a plurality of expansions 127 protruding downward.

The gate lines 121 include a low resistivity conductive layer preferably made of Ag containing metal such as Ag and Ag alloy or Al containing metal such as Al and Al alloy. The gate lines 121 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the gate lines 121 are tapered, and the inclination angle of the lateral sides with respect to a surface of the substrate 110 ranges about 30–80 degrees.

A gate insulating layer 140 preferably made of silicon nitride (SiNx) is formed on the gate lines 121.

A plurality of semiconductor islands 154 preferably made of hydrogenated amorphous silicon (abbreviated to "a-Si") are formed on the gate insulating layer 140.

A plurality of ohmic contact islands 163 and 165 preferably made of silicide or n+ hydrogenated a-Si heavily doped with n type impurity are formed on the semiconductor islands 154. The ohmic contact islands 163 and 165 are located in pairs on the semiconductor islands 154.

The lateral sides of the semiconductor islands 154 and the ohmic contacts 163 and 165 are tapered, and the inclination angles thereof are preferably in a range between about 30–80 degrees.

A plurality of data lines 171, a plurality of drain electrodes 175, and a plurality of storage capacitor conductors 177 are formed on the ohmic contacts 163 and 165 and the gate insulating layer 140.

The data lines 171 for transmitting data voltages extend substantially in the longitudinal direction and intersect the gate lines 121. A plurality of branches of each data line 171, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with a semiconductor island 154 form a TFT having a channel formed in the semiconductor island 154 disposed between the source electrode 173 and the drain electrode 175.

The storage capacitor conductors 177 overlap the expansions 127 of the gate lines 121.

The data lines 171, the drain electrodes 175, and the storage capacitor conductors 177 also include a low resistivity conductive layer preferably made of Ag containing metal such as Ag and Ag alloy or Al containing metal such as Al and Al alloy. The data lines 171, the drain electrodes 175, and the storage capacitor conductors 177 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the data lines 171, the drain electrodes 175, and the storage capacitor conductors 177 are tapered, and the inclination angle of the lateral sides with respect to a surface of the substrate 110 ranges about 30–80 degrees.

The ohmic contacts 163 and 165 interposed only between the underlying semiconductor islands 154 and the overlying data lines 171 and the overlying drain electrodes 175 thereon and reduce the contact resistance therebetween.

A passivation layer 180 is formed on the data lines 171, the drain electrodes 175, the storage conductors 177, and the exposed portions of the semiconductor islands 154. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. Alternatively, the passivation layer 180 may includes both a SiNX film and an organic film.

The passivation layer 180 has a plurality of contact holes 185, 187 and 189 exposing the drain electrodes 175, the storage conductors 177, and end portions 179 of the data lines 171, respectively. The passivation layer 180 and the gate insulating layer 140 has a plurality of contact holes 182 exposing end portions 125 of the gate lines 121.

A plurality of pixel electrodes 190 and a plurality of contact assistants 92 and 97, which are preferably made of IZO or ITO, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receives the data voltages from the drain electrodes 175 and transmits the received data voltages to the storage capacitor conductors 177.

Referring back to FIG. 2, the pixel electrodes 190 supplied with the data voltages generate electric fields in cooperation with the common electrode 270 on the other panel 200, which reorient liquid crystal molecules in the liquid crystal layer 3 disposed therebetween.

As described above, a pixel electrode 190 and a common electrode 270 form a liquid crystal capacitor $C_{LC}$, which stores applied voltages after turn-off of the TFT Q. The storage capacitors $C_{ST}$ are implemented by overlapping the pixel electrodes 190 with the gate lines 121 adjacent thereto (called "previous gate lines"). The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and overlap the expansions 127, under the pixel electrodes 190 for decreasing the distance between the terminals.

The pixel electrodes 190 overlap the gate lines 121 and the data lines 171 to increase aperture ratio but it is optional.

The contact assistants 92 and 97 are connected to the exposed end portions 125 of the gate lines 121 and the exposed end portions 179 of the data lines 171 through the contact holes 182 and 189, respectively. The contact assistants 92 and 97 are not requisites but preferred to protect the exposed portions 125 and 179 and to complement the adhesiveness of the exposed portion 125 and 179 and external devices.

According to another embodiment of the present invention, the pixel electrodes 190 are made of transparent conductive polymer. For a reflective or transflective LCD, the pixel electrodes 190 include opaque reflective metal.

Referring back to FIG. 1, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$–$G_n$ of the panel assembly 300 and synthesizes the gate-on voltage Von and the gate off voltage Voff from an external device to generate gate signals for application to the gate lines $G_1$–$G_n$.

The data driver 500 is connected to the data lines $D_1$–$D_m$ of the panel assembly 300 and applies data voltages selected from the gray voltages supplied from the gray voltage generator 800 to the data lines $D_1$–$D_m$.

The signal controller 600 controls the drivers 400 and 500, etc., and it includes an image signal modifier 610. The image signal modifier 610 may be a stand alone device.

Now, the operation of the LCD will be described in detail.

The signal controller 600 is supplied with three-color image signals R, G and B and input control signals controlling the display thereof such as a vertical synchronization signal Vsync, a horizontal synchronization signal Hsync, a main clock MCLK, and a data enable signal DE, from an external graphic controller (not shown). The image signal modifier 610 of the signal controller 610 converts the three-color image signals R, G and B into four-color image signals and processes and modifies the four-color image signals suitable for the operation of the panel assembly 300 on the basis of the input control signals and the input image signals R, G and B. In addition, the signal controller 600 generates gate control signals CONT1 and data control signals CONT2 for controlling the processed and modified image signals Ro', Go', Bo' and Wo'. The signal controller 600 provides the gate control signals CONT1 for the gate driver 400, and the processed image signals Ro', Go', Bo' and Wo' and the data control signals CONT2 for the data driver 500.

The gate control signals CONT1 include a vertical synchronization start signal STV for informing of start of a frame, a gate clock signal CPV for controlling the output time of the gate-on voltage Von, and an output enable signal OE for defining the width of the gate-on voltage Von. The data control signals CONT2 include a horizontal synchronization start signal STH for informing of start of a horizontal period, a load signal LOAD or TP for instructing to apply the appropriate data voltages to the data lines $D_1$–$D_m$ an inversion control signal RVS for reversing the polarity of the data voltages (with respect to the common voltage Vcom) and a data clock signal HCLK.

The data driver 500 receives a packet of the image data Ro', Go', Bo' and Wo' for a pixel row from the signal controller 600 and converts the image data Ro', Go', Bo' and Wo' into the analog data voltages selected from the gray voltages supplied from the gray voltage generator 800 in response to the data control signals CONT2 from the signal controller 600. The data driver 500 then outputs the data voltages to the data lines the data lines $D_1$–$D_m$.

Responsive to the gate control signals CONT1 supplied from the signal controller 600, the gate driver 400 applies the gate-on voltage $V_{on}$ to the gate line $G_1$–$G_n$, thereby turning on the switching elements Q connected thereto. The data voltages applied to the data lines $D_1$–$D_m$ are supplied to the pixels through the activated switching elements Q.

The data driver 500 applies the data voltages to the corresponding data lines $D_1$–$D_m$ for a turn-on time of the switching elements Q (which is called "one horizontal period" or "1H" and equals to one periods of the horizontal synchronization signal Hsync, the data enable signal DE, and the gate clock signal CPV). Then, the data voltages in turn are supplied to the corresponding pixels via the turned-on switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure by a unit of a horizontal period (which is indicated by 1H and equal to one period of the horizontal synchronization signal Hsync, the data enable signal DE, and a gate clock signal), all gate lines $G_1$–$G_n$ are sequentially supplied with the gate-on voltage $V_{on}$ during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one packet are reversed (which is called "dot inversion").

Now, the conversion of three color image signals into four color image signals is described in detail.

A principle of the conversion of three color image signals into four color image signals is described in detail with reference to FIG. 11.

Figure 11:
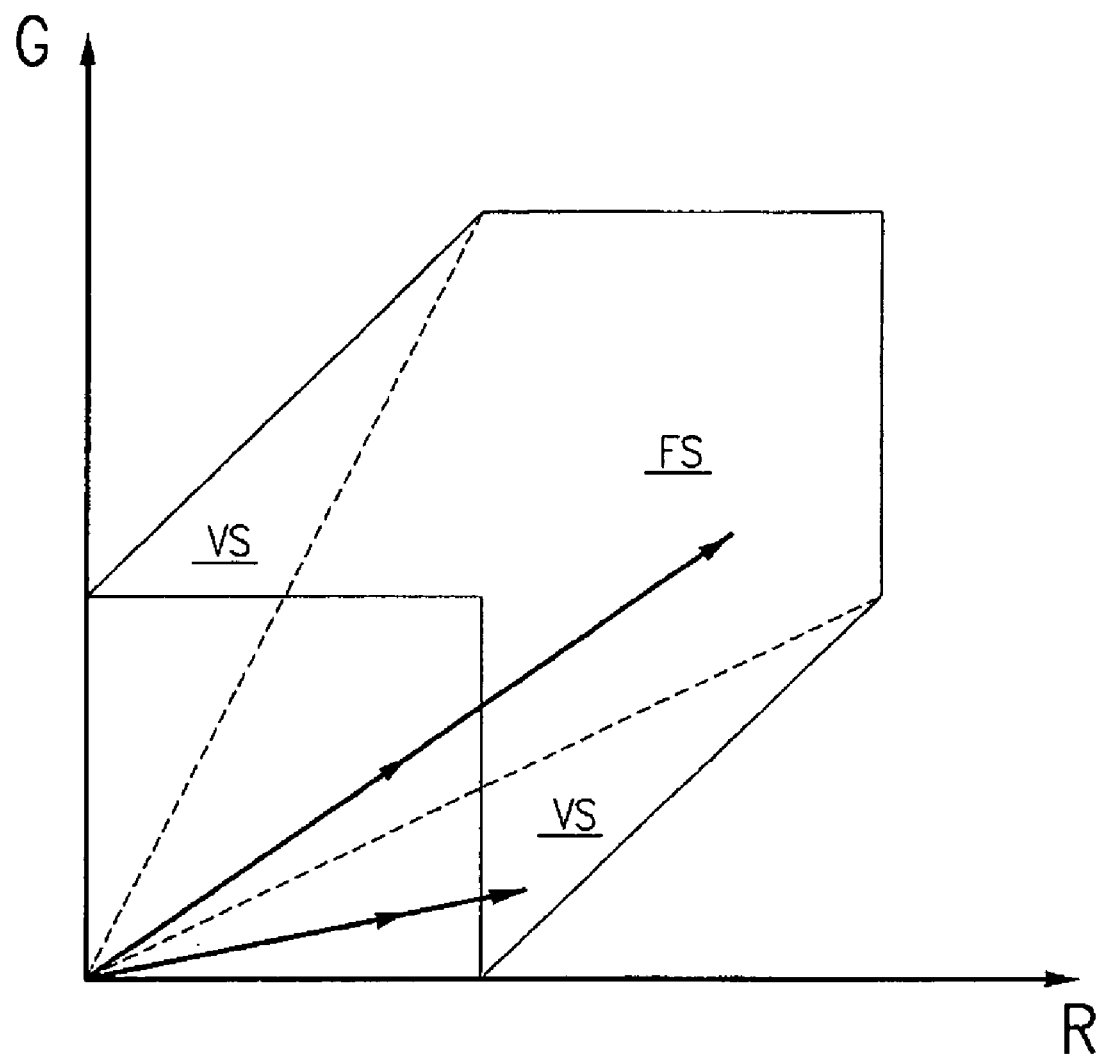
FIG. 11 illustrates a principle of the conversion of three color image signals into four color image signals according to an embodiment of the present invention.

FIG. 11 illustrates a Gamut surface coordinates for red and green colors in a three-dimensional color coordinates having three axes representing luminance of three primary colors, i.e., red, green, and blue colors, respectively.

Referring to FIG. 11, colors that can be represented by three color image signals are located in a square area enclosed by solid lines, while colors that can be represented by four color image signals are disposed in a hexagonal area enclosed by solid lines. The hexagonal area can be obtained by elongating the square area along a diagonal direction, and thus the conversion of the three color image signals into the four color image signals maps a point in the square area into a point in the hexagonal area.

Now, methods of converting three color image signals into four color image signals according to embodiments of the present invention will be described in detail with reference to FIGS. 12 and 13.

Figure 12:
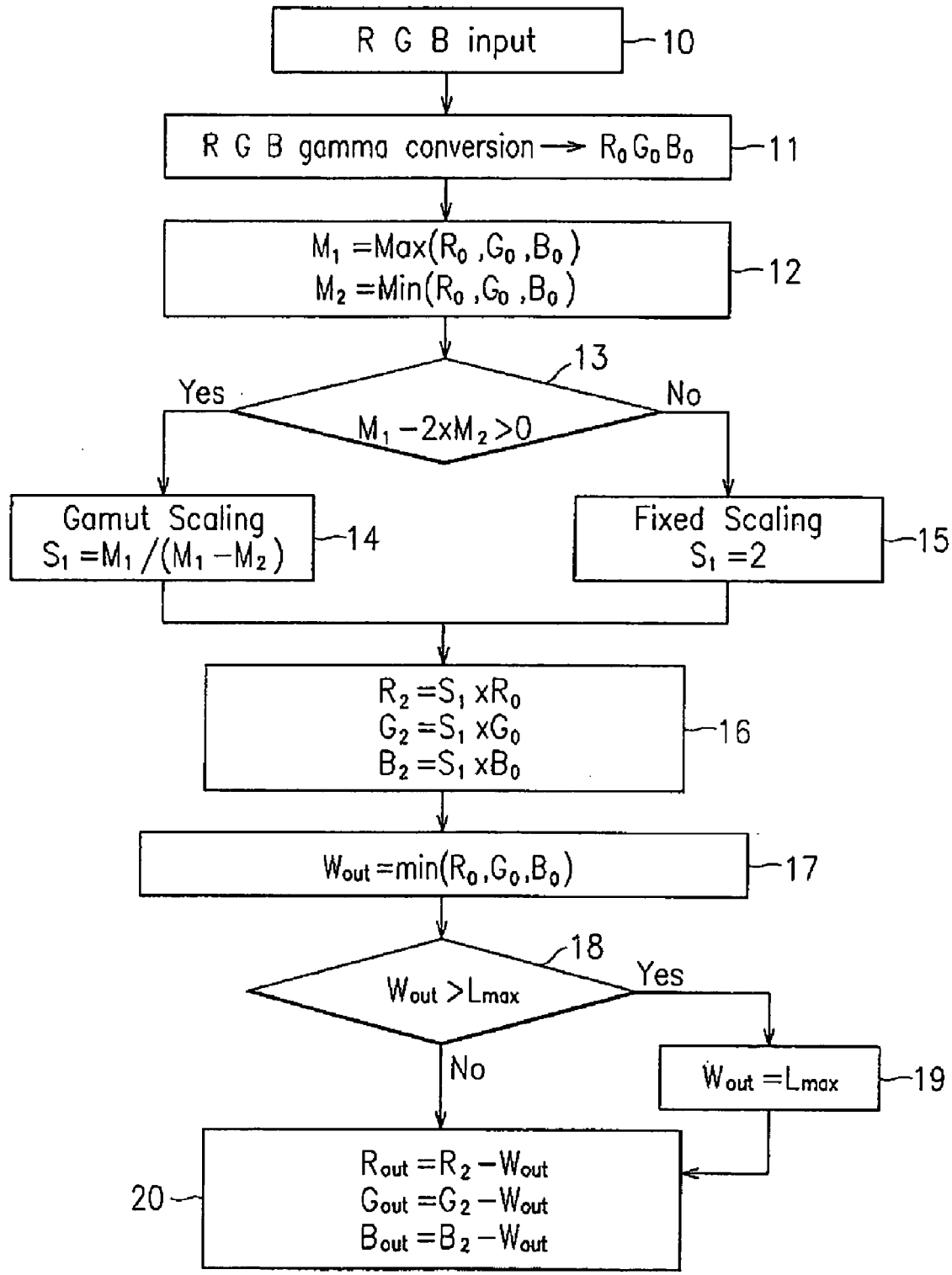
FIG. 12 is a flow chart illustrating a method of converting three color image signals into four color image signals according to an embodiment of the present invention.

FIG. 12 is a flow chart illustrating a method of converting three color image signals into four color image signals according to an embodiment of the present invention.

When a set of input red, green and blue image signals having gray values R, G and B are inputted in the step 10, the image signals are gamma-converted in the step 11.

The gamma conversion means a conversion of a gray value R, G or B of an image signal into luminance value $R_0$, $G_0$ or $B_0$ represented by the gray value R, G or B. For descriptive convenience, reference numerals R, G and B and $R_0$, $G_0$ and $B_0$ also refer to the image signals in the specification. The gamma conversion of an image signal is represented by:

$$X = \alpha GV^\gamma, \quad (1)$$

where X is the luminance value of the signal, GV is the gray value of the signal, and $\gamma$ is a constant called gamma. On the contrary, the gray value GV can be obtained by inverse-gamma-converting the luminance. The inverse gamma conversion is represented by:

$$GV = \alpha' X^{1/\gamma}. \quad (2)$$

Eqs. 1 and 2 are ideal forms, and those for actual LCDs may be complicated.

The coordinates $M_1$ and $M_2$ on a Gamut surface for the image signals $R_0$, $G_0$ and $B_0$ are calculated in the step 12, as follows:

$$M_1 = \text{Max}(R_0, G_0, B_0); \text{ and} \quad (3)$$

$$M_2 = \text{Min}(R_0, G_0, B_0), \quad (4)$$

where Max(x, y, . . . ) means the maximum among x, y, . . . , and Min(x, y, . . . ) means the maximum among x, y . . .

Next, it is determined whether $$M_1 - 2M_2 > 0 \quad (5)$$

to determine whether the set of the image signals $R_0$, $G_0$ and $B_0$ belongs to a fixed scaling area CS or a variable scaling area VS in the step 13.

If Inequality 5 is satisfied, the signal set belongs to the variable scaling area and it is subject to a variable scaling called Gamut scaling in the step 14. A scaling factor $S_1$ for the Gamut scaling is given by:

$$S_1 = M_1/(M_1 - M_2). \quad (6)$$

On the contrary, the signal set belongs to the fixed scaling area if Inequality 5 is not satisfied, and the signals are subject to a fixed scaling in the step 15. The scaling factor $S_1$ for the fixed scaling is given by:

$$S_1 = 2. \quad (7)$$

The values $R_0$, $G_0$ and $B_0$ are multiplied by the scaling factor $S_1$ to obtain increased values $R_2$, $G_2$ and $B_2$ in the step 16.

Next, a luminance value $W_{out}$ of a white image signal is extracted in the step 17. The luminance value $W_{out}$ of the white image signal is given by the minimum of the increased values $R_2$, $G_2$ and $B_2$. That is, $$W_{out} = \text{Min}(R_2, G_2, B_2). \quad (8)$$

It is determined whether the extracted luminance value $W_{out}$ of the white image signal is higher than the maximum luminance $L_{max}$ represented by the highest gray, for example, the 255-th gray among the zero-th to the 255-th grays in the step 18. That is, $$W_{out} > L_{max} \quad (9)$$

When Inequality 9 is satisfied, $\text{Min}(R_2, G_2, B_2)$ in Eq. 8 is substituted with $L_{max}$ in the step 19 such that $W_{out} = L_{max}$. When Inequality 9 is satisfied, Eq. 8 is maintained such that $W_{out} = \text{Min}(R_2, G_2, B_2)$.

The luminance values $R_{out}$, $G_{out}$, and $B_{out}$ of output red, green, and blue image signals are determined by subtracting the luminance value $W_{out}$ of the white image signal from the increased values $R_2$, $G_2$ and $B_2$, respectively, in the step 20.

The luminance values $W_{out}$, $R_{out}$, $G_{out}$ and $B_{out}$ of the output white, red, green, and blue image signals are inverse-gamma-converted to obtain gray values of the output white, red, green, and blue image signals.

Figure 13:
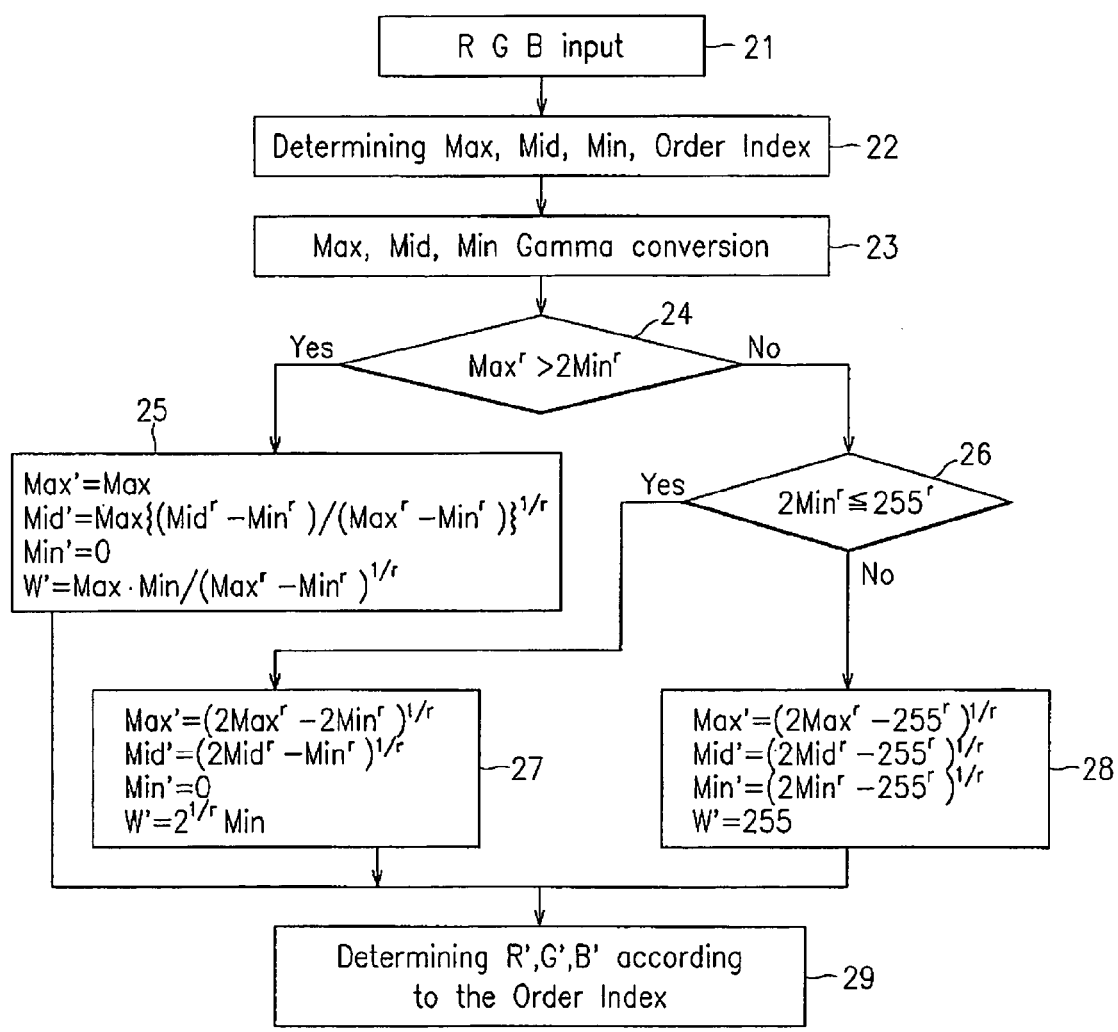
FIG. 13 is a flow chart illustrating a method of converting three color image signals into four color image signals according to another embodiment of the present invention.

FIG. 13 is a flow chart illustrating a method of converting three color image signals into four color image signals according to another embodiment of the present invention.

When a set of input red, green and blue image signals having gray values R, G and B are inputted in the step 21, the gray values R, G and B are arranged in a decreasing or increasing order and an Order Index is assigned to the signal set in the step 22. For example:

$$\text{Max} = R, \text{Mid} = G, \text{Min} = B, \text{ and Order Index} = 1 \text{ when } R \geq G \geq B; \quad (10)$$

$$\text{Max} = R, \text{Mid} = B, \text{Min} = G, \text{ and Order Index} = 2 \text{ when } R \geq B \geq G; \quad (11)$$

$$\text{Max} = G, \text{Mid} = B, \text{Min} = R, \text{ and Order Index} = 3 \text{ when } G \geq B > R; \quad (12)$$

$$\text{Max} = G, \text{Mid} = R, \text{Min} = B, \text{ and Order Index} = 4 \text{ when } G \geq R \geq B; \quad (13)$$

$$\text{Max} = B, \text{Mid} = R, \text{Min} = G, \text{ and Order Index} = 5 \text{ when } B \geq R \geq G; \text{ and} \quad (14)$$

$$\text{Max} = B, \text{Mid} = G, \text{Min} = R, \text{ and Order Index} = 6 \text{ when } B \geq G \geq R. \quad (15)$$

Next, the values Max, Mid and Min are gamma-converted in the step 23.

Subsequently, it is determined whether the signal set is the fixed scaling area FS or the variable scaling area VS using the gamma-converted values $\text{Max}^\gamma$ and $\text{Min}^\gamma$ in the step 24. That is, it is determined whether $\text{Max}^\gamma > 2\text{Min}^\gamma$, and the procedure goes to the step 25 if $\text{Max}^\gamma > 2\text{Min}^\gamma$, while it goes to the step 26 if it is not.

For the variable scaling area, values Max', Mid', Min' and W' are calculated as follows in the step 25:

$$\text{Max}' = \text{Max}; \quad (16)$$

$$\text{Mid}' = \text{Max}[(\text{Mid}^\gamma - \text{Min}^\gamma)/(\text{Max}^\gamma - \text{Min}^\gamma)]^{1/\gamma}; \quad (17)$$

$$\text{Min}' = 0; \text{ and} \quad (17)$$

$$W' = \text{Max} \cdot \text{Min}/(\text{Max}^\gamma - \text{Min}^\gamma)^{1/\gamma}. \quad (18)$$

For the fixed scaling area, it is determined whether $2Min^\gamma \leq (GV_{max})^\gamma$ in the step 26, where $GV_{max}$ is the highest gray, for example, the 255-th gray among the zero-th to the 255-th grays. This step is to determine whether the gray value of the white image signal is larger than the highest gray.

If it is determined that $2Min^\gamma \leq (GV_{max})^\gamma$, the values Max', Mid', Min', and W' are calculated in the step 27 as follows:

$$Max'=(2Max^\gamma-2Min^\gamma)^{1/\gamma}; \qquad (19)$$

$$Mid'=(2Mid^\gamma-2Min^\gamma)^{1/\gamma}; \qquad (20)$$

$$Min'=0; \text{ and} \qquad (21)$$

$$W'=2^{1/\gamma}Min. \qquad (22)$$

If $2Min^\gamma \leq (GV_{max})^\gamma$ is not satisfied, the values Max', Mid', Min', and W' are calculated in the step 28 as follows:

$$Max'=[2\ Max^\gamma-(GV_{max})^\gamma)]^{1/\gamma}; \qquad (23)$$

$$Mid'=[2\ Mid^\gamma-(GV_{max})^\gamma)]^{1/\gamma}; \qquad (24)$$

$$Min'=[2\ Min^\gamma-(GV_{max})^\gamma]^{1/\gamma}; \text{ and} \qquad (25)$$

$$W'=GV_{max}. \qquad (26)$$

If the gamma conversion is represented by a function $\Gamma$ instead of powers shown in Eqs. 1 and 2, $$X=\Gamma(GV); \text{ and} \qquad (27)$$

$$GV=\Gamma^{-1}(X). \qquad (28)$$

In this case, Eqs. 16–26 may be substituted with following equations:

$$Max'=Max, \qquad (29)$$

$$Mid'=Max\ \Gamma^{-1}\{[\Gamma(Mid)-\Gamma(Min)]/[\Gamma(Max)-\Gamma(Min)]\}, \qquad (30)$$

$$Min'=0, \text{ and} \qquad (31)$$

$$W'=Max\ Min/\Gamma^{-1}[\Gamma(Max)-\Gamma(Min)] \text{ when}; \qquad (32)$$

$$Max'=\Gamma^{-1}[2\Gamma(Max)-2\Gamma(Min)], \qquad (33)$$

$$Mid'=\Gamma^{-1}[2\Gamma(Mid)-2\Gamma(Min)], \qquad (34)$$

$$Min'=0, \text{ and} \qquad (35)$$

$$W'=\Gamma^{-1}[2\Gamma(Min)]; \text{ and} \qquad (36)$$

$$Max'=\Gamma^{-1}[2\Gamma(Max)-\Gamma(GV_{max})], \qquad (37)$$

$$Mid'=\Gamma^{-1}[2\Gamma(Mid)-\Gamma(GV_{max})], \qquad (38)$$

$$Min'=\Gamma^{-1}[2\Gamma(Min)-\Gamma(GV_{max})], \text{ and} \qquad (39)$$

$$W'=GV_{max}. \qquad (40)$$

The order indices conserve the order of the gray values of the input signals as follows:

For Order Index=1, R'=Max', G'=Mid', and B'=Min'; (41)

For Order Index=2, R'=Max', G'=Min', and B'=Mid'; (42)

For Order Index=3, R'=Min', G'=Max', and B'=Mid'; (43)

For Order Index=4, R'=Mid', G'=Max', and B'=Min'; (44)

For Order Index=5, R'=Mid', G'=Min', and B'=Max'; and (45)

For Order Index=6, R'=Min', G'=Mid', and B'=Max'. (46)

Accordingly, the gray values of output red, green, and blue signals are determined by Eqs. 41–46 in the step 29.

Since Eqs. 29, 31, 35, and 40 include no error, and the operations shown in Eqs. 36, 37, 38, and 39 can be performed by pre-storing results calculated by a high precision computer into a look-up table for all grays and retrieving from the look-up table, the quantization error hardly occurs. The storage of the look-up table required for 256 grays is equal to 256×8 bits=2 Kb.

Furthermore, since Eqs. 33 and 34 include only gamma conversion, inverse gamma conversion, and subtraction, but no multiplication and no division, the cost for hardware is not so expensive and the quantization error is not so large.

Since the multiplication and the division, which dominantly contribute to the quantization error, are contained only in Eqs. 30 and 32, the conversion shown in FIG. 13 is better than that shown in FIG. 12.

Furthermore, although the conversion shown in FIG. 12 includes m bits×m bits multiplication and 2 m bits/m bits division, the operation shown in Eq. 30 includes m bits/m bits division, inverse gamma conversion, and 8 bits×8 bits multiplication, and the operation shown in Eq. 32 includes 8 bits×8 bits multiplication and 16 bits/8 bits division.

To summarize, although the conversion shown in FIG. 12 requires three m bits×m bits multipliers and three 2 m bits/m bits dividers, the conversion shown in FIG. 13 requires two 8 bits×8 bits multipliers, an m bits/m bits divider, and a 16 bits/8 bits divider. If m=16, a multiplier area for the method shown in FIG. 13 is equal to one sixths of that shown in FIG. 12 and a divider area for the method shown in FIG. 13 is equal to one fourths of that shown in FIG. 12 since the area occupied by a multiplier/divider for A bits×B bits multiplication or A bits/B bits division is proportional to A×B.

Accordingly, the method shown in FIG. 13 requires smaller chip size than that shown in FIG. 12 to reduce manufacturing cost, power consumption, electromagnetic interference (EMI), and heat generation. In addition, the method shown in FIG. 13 is more precise than that shown in FIG. 12 to reduce the quantization error that may cause contours in smooth color gray gradation and sizzling due to amplification of background noise on MPEG (Moving Picture Expert Group) images of DVD (digital versatile disk) or HDTV (high definition television).

An example of hardware implementation of the gamma conversion and the inverse gamma conversion is described in detail.

The gamma conversion is performed by reference to a look-up table. The gamma-converted values for 8 bit grays are calculated by a high precision computer and stored in the look-up table. If m bits are assigned to each of the gamma converted values, the size of the look-up table is 256×m bits. Since the capacity of the look-up table is 4 kb for m=16, there is no difficulty in implementing the hardware. Although m=20, the capacity of the look-up table is only 5 kb.

The inverse gamma conversion may be performed also by reference to a single look-up table. However, it is difficult to implement the look-up table since the size of the look-up table is $2^m \times 8$ bits, which is too large. For example, for m=16, the size of the look-up table is 0.5 Mb, which is comparatively large. If m=20 for increased precision, the size of the look-up table is 8 Mb.

In order to reduce the size of the look-up table for the inverse gamma conversion, the inverse gamma conversion is performed using a plurality of look-up tables used for a plurality of sections of luminance. For example, if $\Gamma(GV)$ $=\alpha(GV)^\gamma$, $\gamma=2.4$, and m=15, the number of the sections is four, and a look-up table is used for each section as follows:

$$G=\Gamma^{-1}_1(X)=\Gamma^{-1}(X) \text{ if } 0\leq X\leq 255 \text{ (Section 1)}; \quad (47)$$

$$G=\Gamma^{-1}_2(X)=\Gamma^{-1}(I4(X)) \text{ if } 256\leq X\leq 4095 \text{ (Section 2)} \text{ or } 16\leq I4(X)\leq 255; \quad (48)$$

$$G=\Gamma^{-1}_3(X)=\Gamma^{-1}(I6(X)) \text{ if } 4096\leq X\leq 16383 \text{ (Section 3) or } 64\leq I6(X)\leq 255; \text{ and} \quad (49)$$

$$G=\Gamma^{-1}_4(X)=\Gamma^{-1}(I7(X)) \text{ if } 16384\leq X\leq 32767 \text{ (Section 4) or } 128\leq I7(X)\leq 255, \quad (50)$$

where IB(A) is the integral number, placed to the left of a decimal point, of a value equal to A divided by $2^B$. For example, I4(X) is the integral number of a value equal to X divided by $2^4$ (=16).

Eqs. 47–50 are obtained by the characteristic of the gamma function $\Gamma(X)$ that is proportional to the powers of the gray. In detail, a small range of the gray is gamma-converted into a large range of the luminance when the gray is high, that is, a large range of the luminance is inverse-gamma-converted into a small range of the luminance. The size of the look-up tables for Sections 1–4 is equal to 256×8 bits=2 kb, which is easily implemented in hardware. Accordingly, the sectional mapping facilitates the implementation of the hardware for the look-up tables even for large m.

The generalization for m follows.

When the bit number of the gamma-converted value is m, the total range of the gray $0\leq X\leq 2^{m-1}$ is divided into n sections $a_1, a_2, \ldots a_{n-2}$, and the value X to be inverse-gamma-converted in the sections $a_1, a_2, \ldots, a_{n-2}$, and $a_{n-1}$ is right shifted by proper values $b_1(=0), b_2, b_3, \ldots, b_{n-1}$ and $b_n$ that are determined so that they may maintain the precision of the conversion and $b_1<b_2<b_3<\ldots, <b_{n-1}<b_n$. The shifted value Ibi(X) (i=1,2, ..., n) is then converted into a final value. The relation is expressed as:

$$G=\Gamma^{-1}_1(X)=\Gamma^{-1}(X) \text{ if } 0\leq X\leq a_1-1 \text{ (Section 1)}; \quad (51)$$

$$G=\Gamma^{-1}_2(X)=\Gamma^{-1}(Ib2(X)) \text{ if } a_1\leq X\leq a_2-1 \text{ (Section 2)}; \quad (52)$$

$$G=\Gamma^{-1}_{n-1}(X)=\Gamma^{-1}(Ibn-1(X)) \text{ if } a_{n-2}\leq X\leq a_{n-1}-1 \text{ (Section (n-1)); and} \quad (53)$$

$$G=\Gamma^{-1}_n(X)=\Gamma^{-1}(Ibn(X)) \text{ if } a_{n-1}\leq X\leq 2^{m-1} \text{ (Section n)}. \quad (54)$$

It will be proven that Eqs. 29–40 coincide with the result of the method shown in FIG. 12.

It will be shown that the output luminance increases by $\Gamma(Max)/[\Gamma(Max)-\Gamma(Min)]$ when $\Gamma(Max)-2\Gamma(Min)>0$, and the output luminance increases twice when $\Gamma(Max)-2\Gamma(Min)\leq 0$.

The output luminance of the red light, the green light, and the blue light are given by $\Gamma(R')+\Gamma(W')$, $\Gamma(G')+\Gamma(W')$, and $\Gamma(B')+\Gamma(W')$.

When $\Gamma(Max)>2\Gamma(Min)$:

$$\Gamma(Max')+\Gamma(W') \quad (55)$$
$$=\Gamma(Max)+\Gamma(Max)\Gamma(Min)/[\Gamma(Max)-\Gamma(Min)]$$
$$=\Gamma(Max)\Gamma(Max)/[\Gamma(Max)-\Gamma(Min)];$$

$$\Gamma(Mid')+\Gamma(W') \quad (56)$$
$$=\Gamma(Max)[\Gamma(Mid)-\Gamma(Min)]/[\Gamma(Max)-\Gamma(Min)]+\Gamma(Max)\Gamma(Min)/[\Gamma(Max)-\Gamma(Min)]$$

-continued
$$=\Gamma(Mid)\Gamma(Max)/[\Gamma(Max)-\Gamma(Min)]; \text{ and}$$

$$\Gamma(Min')+\Gamma(W') \quad (57)$$
$$=0+\Gamma(Max)\Gamma(Min)/[\Gamma(Max)-\Gamma(Min)]$$
$$=\Gamma(Min)\Gamma(Max)/[\Gamma(Max)-\Gamma(Min)].$$

Eqs. 55, 56 and 57 show that the output luminance for the red, green, and blue colors increases by $\Gamma(Max)/[\Gamma(Max)-\Gamma(Min)]$ when $\Gamma(Max)>2\Gamma(Min)$.

When $\Gamma(Max)\leq 2\Gamma(Min)\leq \Gamma(GV_{max})$:

$$\Gamma(Max')+\Gamma(W')=2\Gamma(Max)-2\Gamma(Min)+2\Gamma(Min)=2\Gamma(Max); \quad (58)$$

$$\Gamma(Mid')+\Gamma(W')=2\Gamma(Mid)-2\Gamma(Min)+2\Gamma(Min)=2\Gamma(Max); \text{ and} \quad (59)$$

$$\Gamma(Min')+\Gamma(W')=0+2\Gamma(Min)=2\Gamma(Min). \quad (60)$$

When $\Gamma(Max)\leq 2\Gamma(Min)$ and $2\Gamma(Min)>\Gamma(GV_{max})$:

$$\Gamma(Max')+\Gamma(W')=2\Gamma(Max)-\Gamma(GV_{max})+\Gamma(GV_{max})=2\Gamma(Max); \quad (61)$$

$$\Gamma(Mid')+\Gamma(W')=2\Gamma(Mid)-\Gamma(GV_{max})+\Gamma(GV_{max})=2Max); \text{ and} \quad (62)$$

$$\Gamma(Min')+\Gamma(W')=2\Gamma(Min)-\Gamma(GV_{max})+\Gamma(GV_{max})=2\Gamma(Min). \quad (63)$$

Eqs. 58–63 show that the output luminance for the red, green, and blue colors increases twice when $\Gamma(Max)\leq 2\Gamma(Min)$.

Figure 14A:
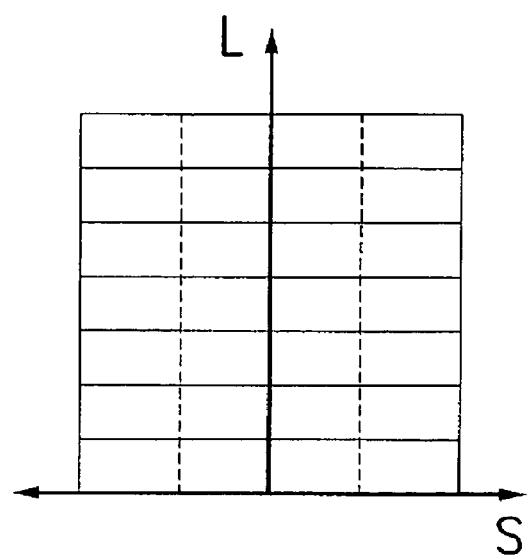
FIGS. 14A–14C are graphs illustrating luminance as function of saturation for various LCDs.
Figure 14B:
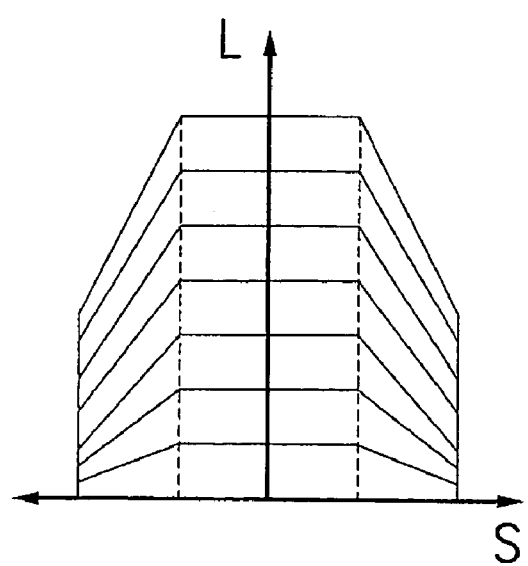
Figure 14C:
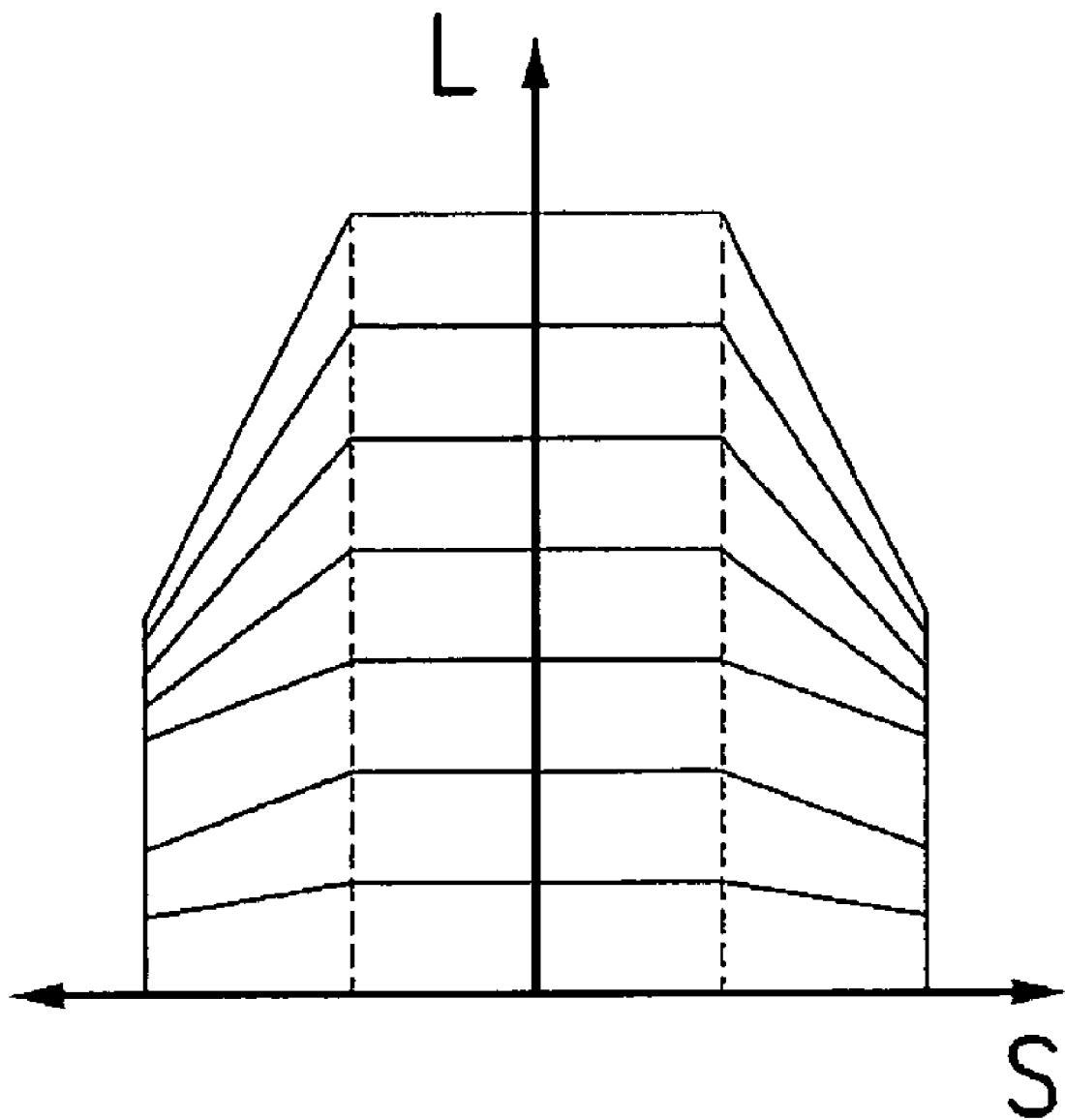

FIGS. 14A–14C are graphs illustrating luminance (L) as function of saturation (S). FIG. 4A illustrates the luminance (L) for a three color LCD with a backlight lamp having 50% increased luminance, FIG. 4B illustrates the luminance (L) for a four color LCD, and FIG. 14C illustrates the luminance (L) for a four color LCD according to an embodiment of the present invention. The saturation (S) in FIGS. 14A–14C increases as it goes to ends and the curved lines indicate iso-gray lines.

Referring to FIG. 14A, the increase of the luminance of the backlight lamp uniformly increases the luminance for all ranges of the saturation. However, the increase of the luminance due to the addition of white pixels increases the luminance for achromatic colors more than pure, unmixed colors. FIGS. 14B and 14C show that the increment of the luminance decreases from the achromatic colors at a center position to the pure colors at end positions. FIG. 14C shows that the distance between the iso-gray lines becomes close as the gray increases for reducing the color distortion due to the non-uniform increase of the luminance.

The embodiment shown in FIG. 14C is effective since the human eyes are more insensitive to the variation of the luminance for higher grays than that for lower grays.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An apparatus of driving a display device including a plurality of four color pixels, the apparatus comprising:

an input unit receiving three color image signals;

an image signal modifier converting the three color image signals into four-color image signals; and an output unit outputting the four-color image signals, wherein the image signal modifier (a) compares grays of the input image signals in a set of three color image signals to determine a maximum input gray (Max), a middle input gray (Mid), and a minimum input gray (Min) among the input image signals and to assign an order index to the signal set;

(b) gamma-converts the Max, Mid, and Min luminance values into Γ(Max), Γ(Mid), and Γ(Min), respectively, wherein an inverse gamma conversion is indicated by $\Gamma^{-1}$;

(c) determines a maximum output gray (Max'), a middle output gray (Mid'), a minimum output gray (Min'), and an output white signal (W') such that if Γ(Max)>2Γ(Min), Max'=Max, Mid'=Max $\Gamma^{-1}${[Γ(Mid)−Γ(Min)]/[Γ(Max)−Γ(Min)]}, Min'=0, and W'=Max Min/$\Gamma^{-1}$[Γ(Max)−Γ(Min)];

if Γ(Max)≦2Γ(Min) and 2Γ(Min)≦Γ(Gmax), where Gmax is a highest gray,

Max'=$\Gamma^{-1}$[2Γ(Max)−2Γ(Min)],

Mid'=$\Gamma^{-1}$[2Γ(Mid)−2Γ(Min)],

Min'=0,

W'=$\Gamma^{-1}$[2Γ(Min)]; and if Γ(Max)>2Γ(Min) and 2Γ(Min)>Γ(Gmax),

Max'=$\Gamma^{-1}$[2Γ(Max)−Γ(Gmax)],

Mid'=$\Gamma^{-1}$[2Γ(Mid)−Γ(Gmax)],

Min'=$\Gamma^{-1}$[2Γ(Min)−Γ(Gmax)], and

W'=Gmax; and (d) generates the four-color image signals from the Max', Mid', Min', and W' based on the order; and wherein said apparatus drives said display device according to the four-color image signals.

2. The apparatus of claim 1, wherein the gamma conversion is performed by using a look-up table.

3. The apparatus of claim 1, wherein the inverse gamma conversion is performed by using at least a look-up table, the inverse gamma conversion maps a plurality of sections of a first variable into a plurality of sections of a second variable such that the sections of the first variable have different lengths, a longer section of the first variable includes higher values, and the sections of the second variable have substantially the same length.

4. The apparatus of claim 1, further comprising:

a gray voltage generator generating a plurality of gray voltages; and a data driver selecting data voltages among the gray voltages corresponding to the four-color image signals and applying the data voltages to the pixels.

5. The apparatus of claim 1, wherein the four-color image signals have a plurality of grays representing luminance and luminance difference between higher grays is smaller than luminance difference between lower grays.

6. The apparatus of claim 1, wherein the order index applies an order of the grays of the input image signals to grays of the four-color image signals.

7. A method of driving a display device including a plurality of four color pixels, the method comprising:

(a) comparing grays of input image signals in a set of input three-color image signals to determine a maximum input gray (Max), a middle input gray (Mid), and a minimum input gray (Min) among the input image signals and to assign an order index to the signal set;

(b) gamma-converting the Max, Mid, and Min luminance values into Γ(Max), Γ(Mid), and Γ(Min), respectively, wherein an inverse gamma conversion is indicated by $\Gamma^{-1}$;

(c) determining a maximum output gray (Max'), a middle output gray (Mid'), a minimum output gray (Min'), and an output white signal (W') such that if Γ(Max)>2Γ(Min), Max'=Max, Mid'=Max $\Gamma^{-1}${[Γ(Mid)−Γ(Min)]/[Γ(Max)−Γ(Min)]}, Min'=0, and W'=Max Min/$\Gamma^{-1}$[Γ(Max)−Γ(Min)];

if Γ(Max)≦2Γ(Min) and 2Γ(Min)≦Γ(Gmax), where Gmax is a highest gray,

Max'=$\Gamma^{-1}$[2Γ(Max)−2Γ(Min)],

Mid'=$\Gamma^{-1}$[2Γ(Mid)−2Γ(Min)],

Min'=0,

W'=$\Gamma^{-1}$[2Γ(Min)]; and if Γ(Max)>2Γ(Min) and 2Γ(Min)>Γ(Gmax),

Max'=$\Gamma^{-1}$[2Γ(Max)−Γ(Gmax)],

Mid'=$\Gamma^{-1}$[2Γ(Mid)−Γ(Gmax)],

Min'=$\Gamma^{-1}$[2Γ(Min)−Γ(Gmax)], and

W'=Gmax; and (d) generating the four-color image signals from the Max', Mid', Min', and W' based on the order;

(e) driving said display device according to the four-color image signals.

8. The method of claim 7, wherein the inverse gamma conversion maps a plurality of sections of a first variable into a plurality of sections of a second variable such that the sections of the first variable have different lengths, a longer section of the first variable includes higher values, and the sections of the second variable have substantially the same length.

9. The method of claim 8, wherein the inverse gamma conversion is performed by using at least a look-up table.

10. The method of claim 7, wherein the gamma conversion is performed by using a look-up table.

11. The method of claim 7, further comprising:
generating a plurality of gray voltages;
selecting data voltages among the gray voltages corresponding to the four color image signals; and
applying the data voltages to the pixels.

12. The method of claim 7, wherein the four-color image signals have a plurality of grays representing luminance and luminance difference between higher grays is smaller than luminance difference between lower grays.

13. The method of claim 7, wherein the order index applies an order of the grays of the input image signals to grays of the four-color image signals.

* * * * *